(12) United States Patent
Sudeji

(10) Patent No.: US 12,319,783 B2
(45) Date of Patent: Jun. 3, 2025

(54) CYCLOOLEFIN POLYMER, METHOD FOR PRODUCING SAME, AND OPTICAL ELEMENT

(71) Applicant: ZEON CORPORATION, Tokyo (JP)

(72) Inventor: Hironari Sudeji, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 551 days.

(21) Appl. No.: 17/755,727

(22) PCT Filed: Nov. 26, 2020

(86) PCT No.: PCT/JP2020/044086
§ 371 (c)(1),
(2) Date: May 6, 2022

(87) PCT Pub. No.: WO2021/107041
PCT Pub. Date: Jun. 3, 2021

(65) Prior Publication Data
US 2023/0002544 A1    Jan. 5, 2023

(30) Foreign Application Priority Data

Nov. 29, 2019   (JP) ................................ 2019-217426

(51) Int. Cl.
  *C08G 61/08*  (2006.01)
  *G02B 1/04*   (2006.01)

(52) U.S. Cl.
  CPC .............. *C08G 61/08* (2013.01); *G02B 1/04* (2013.01); *C08G 2261/3324* (2013.01); *C08G 2261/418* (2013.01)

(58) Field of Classification Search
  USPC ........................................................ 526/281
  See application file for complete search history.

(56) References Cited

U.S. PATENT DOCUMENTS

| 5,194,534 A | * | 3/1993 | Bell ....................... C08G 61/08 |
| | | | 502/158 |
| 2008/0033133 A1 | | 2/2008 | Watanabe et al. |
| 2020/0264511 A1 | | 8/2020 | Inoue et al. |
| 2020/0369812 A1 | | 11/2020 | Wasa et al. |

FOREIGN PATENT DOCUMENTS

| JP | 2008031319 A | 2/2008 |
| JP | 2008031320 A | 2/2008 |
| JP | 2009046614 A | 3/2009 |
| JP | 2009046615 A | 3/2009 |
| JP | 2017134305 A | 8/2017 |
| WO | 2018221575 A1 | 12/2018 |
| WO | 2019107363 A1 | 6/2019 |

OTHER PUBLICATIONS

May 17, 2022, International Preliminary Report on Patentability issued in the International Patent Application No. PCT/JP2020/044086.
Oct. 12, 2023, the Extended European Search Report issued by the European Patent Office in the corresponding European Patent Application No. 20893285.5.
Jan. 19, 2021, International Search Report issued in the International Patent Application No. PCT/JP2020/044086.

* cited by examiner

*Primary Examiner* — Fred M Teskin
(74) *Attorney, Agent, or Firm* — KENJA IP LAW PC

(57) ABSTRACT

Provided are a cycloolefin polymer simultaneously having a high refractive index, a low Abbe number, and low birefringence and also a method of producing this cycloolefin polymer and an optical element in which this cycloolefin polymer is used. The cycloolefin polymer is a polymer, or hydrogenated product thereof, said polymer comprising a structural unit derived from a naphthyl group-containing alicyclic compound (A) represented by following formula (1), in a specific proportion. In formula (1), one of $R_{2a}$ to $R_{5a}$ is a naphthyl group and remaining groups among $R_{2a}$ to $R_{5a}$ and $R_{1a}$ are as defined in the specification.

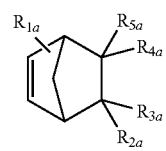

(1)

10 Claims, No Drawings

CYCLOOLEFIN POLYMER, METHOD FOR PRODUCING SAME, AND OPTICAL ELEMENT

TECHNICAL FIELD

The present disclosure relates to a cycloolefin polymer and method of producing the cycloolefin polymer, and also relates to an optical element in which the cycloolefin polymer is used.

BACKGROUND

In recent years, polymers obtained through ring-opening or addition polymerization of cycloolefins have been attracting attention as materials for optical elements and medical containers.

As one example, Patent Literature (PTL) 1 discloses a norbornene-based ring-opened (co)polymer that has excellent transparency and heat resistance, high solubility in organic solvents, and specific birefringence and wavelength dependence properties. As another example, PTL 2 discloses a cycloolefin copolymer and a film formed of the copolymer that effectively cause the display of reverse wavelength dispersion of birefringence. As another example, PTL 3 discloses a cycloolefin-based copolymer that has a high refractive index while also having an Abbe number that can be adjusted to a low level and also discloses a medical container having excellent transparency and little coloring caused by electron beam or gamma ray irradiation. As another example, PTL 4 discloses a norbornene-based polymer film that can increase the degree of wavelength dispersion so as to improve the color of a liquid-crystal display.

CITATION LIST

Patent Literature

PTL 1: JP2009-46615A
PTL 2: JP2009-46614A
PTL 3: WO2019/107363A1
PTL 4: JP2008-31319A

SUMMARY

Technical Problem

In order to enable a greater degree of freedom in the design of optical elements such as optical lenses, there is demand for a resin that has a high refractive index, a lower Abbe number than a conventional cycloolefin resin, and low birefringence when used in an optical element.

However, it has not been possible to simultaneously achieve a high refractive index, a low Abbe number, and low birefringence (for example, stress birefringence) with the conventional ring-opened and addition polymers described above.

Accordingly, an object of the present disclosure is to provide a cycloolefin polymer (polymer obtained by ring-opening polymerization or addition polymerization) that simultaneously has a high refractive index, a low Abbe number, and low birefringence and also to provide a method of producing this cycloolefin polymer and an optical element in which this cycloolefin polymer is used.

Solution to Problem

The inventor conducted diligent investigation with the aim of solving the problem set forth above. Moreover, the inventor made a new discovery that a high refractive index, a low Abbe number, and low birefringence (low stress optic coefficient) are simultaneously obtained in the case of a polymer, or hydrogenated product thereof, that includes a structural unit derived from a naphthyl group-containing alicyclic compound (A) as a structural unit in a specific proportion.

The inventor completed the present disclosure based on the new finding set forth above.

Specifically, the present disclosure aims to advantageously solve the problem set forth above, and a presently disclosed cycloolefin polymer is a polymer or a hydrogenated product thereof, said polymer comprising a structural unit derived from a naphthyl group-containing alicyclic compound (A) represented by following formula (1):

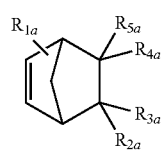

(1)

where any one of $R_{2a}$ to $R_{5a}$ is a naphthyl group and remaining groups among $R_{2a}$ to $R_{5a}$ and $R_{1a}$ are each independently:
- (i) a hydrogen atom;
- (ii) a halogen atom; or
- (iii) a substituted or unsubstituted hydrocarbon group having a carbon number of 1 to 30 and optionally having a linking group comprising an oxygen atom, a nitrogen atom, a sulfur atom, or a silicon atom, except for the hydrocarbon group comprising an aromatic ring, and optionally comprising structural units derived from other monomers, wherein the proportion of the structural unit derived from said compound (A) among all structural units is not less than 20 mol % and not more than 100 mol %.

The proportion constituted by the structural unit derived from the compound (A) among all structural units is preferably not less than 20 mol % and not more than 90 mol %. Moreover, the remaining groups among $R_{2a}$ to $R_{5a}$, other than the naphthyl group, and $R_{1a}$ are preferably each a hydrogen atom.

The presently disclosed cycloolefin polymer is preferably a polymer, or hydrogenated product thereof, comprising:
- the structural unit derived from the compound (A);
- a structural unit derived from at least one norbornene-based monomer (B) different from the compound (A); and optionally structural units derived from other monomers.

The norbornene-based monomer (B) is preferably:
- (i) a norbornene that is unsubstituted or has an alkyl group, an alkenyl group, an aromatic ring group, an oxygen atom-containing polar group, or a nitrogen atom-containing polar group as a substituent;
- (ii) a monomer indicated by following formula (3):

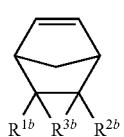

(3)

where
- $R^{1b}$ and $R^{2b}$ each independently represent a hydrogen atom; a halogen atom; a hydrocarbon group having a carbon number of 1 to 20 and optionally having a substituent; or an organic group comprising a silicon atom, an oxygen atom, or a nitrogen atom,
- $R^{1b}$ and $R^{2b}$ are optionally bonded to each other to form a ring, and
- $R^{3b}$ is a divalent hydrocarbon group having a carbon number of 1 to 20 and optionally having a substituent; or (iii) a monomer indicated by following formula (4):

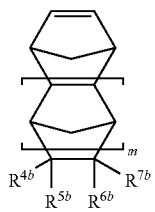

(4)

where
- $R^{4b}$ to $R^{7b}$ each independently represent a hydrogen atom, a halogen atom; a hydrocarbon group having a carbon number of 1 to 20 and optionally having a substituent; or an organic group comprising a silicon atom, an oxygen atom, or a nitrogen atom,
- $R^{4b}$ and $R^{6b}$ are optionally bonded to each other to form a ring, and
- m is 1 or 2.

The weight-average molecular weight of the cycloolefin polymer is preferably 20,000 or more, and is preferably 40,000 or less.

The refractive index ($n_d$) of the cycloolefin polymer is preferably 1.545 or more, and is preferably 1.640 or less. The Abbe number ($v_d$) of the presently disclosed cycloolefin polymer is preferably 20 or more, and is preferably 50 or less. Moreover, the stress birefringence ($C_R$) of the presently disclosed cycloolefin polymer is preferably $-500 \times 10^{-12}$ $Pa^{-1}$ or more, and is preferably $1,400 \times 10^{-12}$ $Pa^{-1}$ or less. When the refractive index, Abbe number, and stress birefringence are within the ranges set forth above, this enables a higher degree of freedom in optical design when the cycloolefin polymer is used as a material of an optical element.

Note that the refractive index, Abbe number, and stress birefringence referred to in the present disclosure can be measured according to methods described in the EXAMPLES section of the present specification.

In a case in which the presently disclosed cycloolefin polymer is a polymer, or hydrogenated product thereof, that includes structural units derived from the naphthyl group-containing alicyclic compound (A) and optionally other monomers, the presently disclosed cycloolefin polymer can easily be produced using a production method that comprises a step of performing polymerization (for example, ring-opening polymerization or addition polymerization) of a mixed monomer that, in specific proportions, includes: the naphthyl group-containing alicyclic compound (A) as a monomer or a polymer including a structural unit derived from the compound (A) and optionally structural units derived from other monomers; and optionally other monomers. Moreover, in a case in which the presently disclosed cycloolefin polymer is a polymer, or hydrogenated product thereof, that includes structural units derived from the naphthyl group-containing alicyclic compound (A) and at least one norbornene-based monomer (B) differing from the compound (A) and that optionally includes structural units derived from other monomers, the presently disclosed cycloolefin polymer can easily be produced by a production method that comprises a step of performing polymerization (for example, ring-opening polymerization or addition polymerization) of a mixed monomer that, in specific proportions, includes: the naphthyl group-containing alicyclic compound (A) as a monomer or a polymer including a structural unit derived from the compound (A) and optionally structural units derived from other monomers; at least one norbornene-based monomer (B) differing from the naphthyl group-containing alicyclic compound (A) or a polymer including a structural unit derived from the norbornene-based monomer (B) and optionally structural units derived from other monomers; and optionally other monomers or polymers. The ring-opening polymerization may be performed in the presence of a metathesis polymerization catalyst, for example. The addition polymerization may be performed in the presence of a Ziegler-Natta catalyst, a metallocene catalyst, a nickel catalyst, or a palladium catalyst, for example. The production method of the cycloolefin polymer may further comprise a step of hydrogenating a polymer.

Moreover, the present disclosure aims to advantageously solve the problem set forth above, and a presently disclosed optical element comprises the cycloolefin polymer set forth above. The inclusion of the cycloolefin polymer set forth above enables advantageous use as a material of an optical element or the like.

Advantageous Effect

According to the present disclosure, it is possible to provide a cycloolefin polymer simultaneously having a high refractive index, a low Abbe number, and low birefringence (for example, stress birefringence), and also to provide a method of producing this cycloolefin polymer and an optical element in which this cycloolefin polymer is used.

DETAILED DESCRIPTION

The following provides a detailed description of embodiments of the present disclosure.
(Cycloolefin Polymer)

The presently disclosed cycloolefin polymer is a polymer (for example, a polymer obtained by ring-opening polymerization or addition polymerization) of a mixed monomer that includes a naphthyl group-containing alicyclic compound (A) and optionally includes other monomers, or is a hydrogenated product of this polymer. The proportion constituted by the naphthyl group-containing alicyclic compound (A) in the mixed monomer is not less than 20 mol % and not more than 100 mol %. The presently disclosed cycloolefin polymer has excellent characteristics in terms of any of high refractive index, low Abbe number, low birefringence (for example, stress birefringence), and high glass-transition temperature. Note that the term "polymer" as used in the present specification may refer to a polymer formed from a single type of structural unit (for example, a homopolymer) or may refer to a copolymer.

Moreover, the presently disclosed cycloolefin polymer may preferably be a polymer (for example, a polymer obtained by ring-opening polymerization or addition polymerization) of a mixed monomer that includes a naphthyl group-containing alicyclic compound (A) and at least one norbornene-based monomer (B) differing from the naphthyl group-containing alicyclic compound (A) and that optionally includes other monomers, or may preferably be a hydrogenated product of this polymer. The proportion constituted by the naphthyl group-containing alicyclic compound (A) in the mixed monomer is not less than 20 mol % and not more than 100 mol %. The presently disclosed cycloolefin polymer may, for example, be a random copolymer or a block copolymer. When the presently disclosed cycloolefin polymer is a copolymer including a structural unit derived from the compound (A), a structural unit derived from the norbornene-based monomer (B), and optionally structural units derived from other monomers, this is preferable because the copolymer has even better characteristics in terms of any of even higher refractive index, even lower Abbe number, even lower birefringence (for example, stress birefringence), and even higher glass-transition temperature as compared to a polymer that is obtained through polymerization of the naphthyl group-containing alicyclic compound (A) as a single monomer.

<Naphthyl Group-Containing Alicyclic Compound>

The naphthyl group-containing alicyclic compound (A) is a compound represented by the following formula (1).

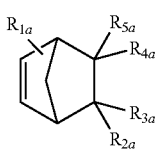

(1)

In formula (1), one of $R_{2a}$ to $R_{5a}$ is a naphthyl group and remaining groups among $R_{2a}$ to $R_{5a}$ and $R_{1a}$ are each, independently of one another:
  (i) a hydrogen atom;
  (ii) a halogen atom; or
  (iii) a substituted or unsubstituted hydrocarbon group, other than an aromatic ring-containing hydrocarbon group, that has a carbon number of 1 to 30 and optionally includes a linking group including an oxygen atom, a nitrogen atom, a sulfur atom, or a silicon atom.

The naphthyl group-containing alicyclic compound (A) may be a compound having a 1-naphthyl group or a 2-naphthyl group bonded as the naphthyl group or may be a mixture of such compounds. The format of bonding of a naphthyl group with a norbornene ring may, in terms of stereoisomerism, be exo bonding (bonding in the same direction as the bridgehead methylene) or endo bonding (bonding in the opposite direction to the bridgehead methylene). The naphthyl group-containing alicyclic compound (A) may be a compound in which the naphthyl group is exo or endo bonded to the norbornene ring (i.e., may be an exo isomer or an endo isomer) or may be a mixture of such compounds. Accordingly, the naphthyl group-containing alicyclic compound (A) may be a 1-naphthyl group-exo-bonded compound, a 2-naphthyl group-exo-bonded compound, a 1-naphthyl group-endo-bonded compound, a 2-naphthyl group-endo-bonded compound, or any mixture of these compounds.

The halogen atom may be a fluorine atom, a chlorine atom, a bromine atom, or an iodine atom.

The hydrocarbon group having a carbon number of 1 to 30 may be an alkyl group such as a methyl group, an ethyl group, or a propyl group; a cycloalkyl group such as a cyclopentyl group or a cyclohexyl group; an alkenyl group such as a vinyl group or an allyl group; an alkylidene group such as an ethylidene group or a propylidene group; or the like, for example. These hydrocarbon groups are optionally substituted, and examples of possible substituents include halogen atoms such as fluorine, chlorine, and bromine, a phenylsulfonyl group, a cyano group, and the like.

Moreover, the substituted or unsubstituted hydrocarbon group described above may be directly bonded to the ring structure or may be bonded via a linking group. The linking group may, for example, be a divalent hydrocarbon group having a carbon number of 1 to 10 (for example, an alkylene group represented by $-(CH_2)_q-$ (q is an integer of 1 to 10)); a linking group including an oxygen atom, a nitrogen atom, a sulfur atom, or a silicon atom (for example, a carbonyl group (—CO—), a carbonyloxy group (—COO—), a sulfonyl group (—SO$_2$—), a sulfonyl ester group (—SO$_2$—O—), an ether bond (—O—), a thioether bond (—S—), an imino group (—NH—), an amide bond (—NHCO—), or a siloxane bond (—Si(R$_2$)O—) (R is an alkyl group such as a methyl or ethyl)); or a group in which two or more of these groups are combined and linked.

The remaining groups among $R_{2a}$ to $R_{5a}$, other than the naphthyl group, and $R_{1a}$ are preferably all hydrogen atoms.

<Norbornene-Based Monomer>

The norbornene-based monomer (B) is a compound having a norbornene structure represented by formula (2).

(2)

The norbornene-based monomer (B) may be a norbornene-based monomer that does not have a ring condensed with a norbornene ring in a molecule thereof, a polycyclic norbornene-based monomer having three or more rings, or the like.

Examples of norbornene-based monomers that do not have a ring condensed with a norbornene ring in a molecule thereof include unsubstituted and alkyl group-containing norbornenes such as norbornene, 5-methylnorbornene, 5-ethylnorbornene, 5-butylnorbornene, 5-hexylnorbornene, 5-decylnorbornene, 5-cyclohexylnorbornene, and 5-cyclopentylnorbornene;

alkenyl group-containing norbornenes such as 5-ethylidene norbornene, 5-vinylnorbornene, 5-propenylnorbornene, 5-cyclohexenylnorbornene, and 5-cyclopentenylnorbornene;

aromatic ring-containing norbornenes such as 5-phenylnorbornene;

norbornenes including an oxygen atom-containing polar group such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methylpropionate, norbornenyl-2-methyloctanate, 5-hydroxymethylnorbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; and norbornenes including a nitrogen atom-containing polar group such as 5-cyanonorbornene.

The polycyclic norbornene-based monomer having three or more rings is a norbornene-based monomer that includes a norbornene ring and one or more rings condensed with the norbornene ring in a molecule thereof. Specific examples of such monomers include monomers indicated by formula (3) and formula (4), shown below.

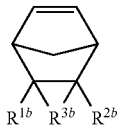

(3)

(In formula (3),
$R^{1b}$ and $R^{2b}$ each represent, independently of each other, a hydrogen atom, a halogen atom, an optionally substituted hydrocarbon group having a carbon number of 1 to 20 (for example, an alkyl group), or a substituent including a silicon atom, an oxygen atom, or a nitrogen atom, and may be bonded to each other to form a ring, and
$R^{3b}$ is an optionally substituted divalent hydrocarbon group having a carbon number of 1 to 20 (for example, an alkylene group).)

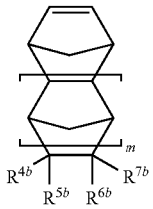

(4)

In formula (4),
$R^{4b}$ to $R^{7b}$ each represent, independently of one another, a hydrogen atom, a halogen atom, an optionally substituted hydrocarbon group having a carbon number of 1 to 20 (for example, an alkyl group), or a substituent including a silicon atom, an oxygen atom, or a nitrogen atom, and $R^{4b}$ and $R^{6b}$ may be bonded to each other to form a ring, and
m is 1 or 2.

Examples of monomers indicated by formula (3) include norbornene-based monomers that do not include an aromatic ring structure such as dicyclopentadiene, methyldicyclopentadiene, and tricyclo[5.2.1.0$^{2,6}$]dec-8-ene. Other examples include norbornene derivatives that do include an aromatic ring such as tetracyclo[9.2.1.0$^{2,1}$.0$^{3,8}$]tetradeca-3,5,7,12-tetraene (also referred to as 1,4-methano-1,4,4a,9a-tetrahydro-9H-fluorene) and tetracyclo[10.2.1.0$^{2,1}$.0$^{4,9}$]pentadeca-4,6,8,13-tetraene (also referred to as 1,4-methano-1,4,4a,9,9a,10-hexahydroanthracene).

Examples of monomers indicated by formula (4) include tetracyclododecenes for which m is 1 and hexacycloheptadecenes for which m is 2.

Examples of tetracyclododecenes include unsubstituted and alkyl group-containing tetracyclododecenes such as tetracyclododecene, 8-methyltetracyclododecene, 8-ethyltetracyclododecene, 8-cyclohexyltetracyclododecene, 8-cyclopentyltetracyclododecene, and 8-methoxycarbonyl-8-methyltetracyclo[4.4.0.12,5.17,10]-3-dodecene;

tetracyclododecenes including a double bond outside of a ring such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene;

aromatic ring-containing tetracyclododecenes such as 8-phenyltetracyclododecene;

tetracyclododecenes including an oxygen atom-containing substituent such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride;

tetracyclododecenes including a nitrogen atom-containing substituent such as 8-cyanotetracyclododecene and tetracyclododecene-8,9-dicarboxylic acid imide;

tetracyclododecenes including a halogen atom-containing substituent such as 8-chlorotetracyclododecene; and tetracyclododecenes including a silicon atom-containing substituent such as 8-trimethoxysilyltetracyclododecene.

The hexacycloheptadecene can be any Diels-Alder adduct of a tetracyclododecene such as described above and cyclopentadiene.

The norbornene-based monomer (B) is, from among the norbornene-based monomers described above, preferably a non-polar norbornene-based monomer from a viewpoint of obtaining a better refractive index, Abbe number, birefringence (for example, stress birefringence), or glass-transition temperature, and is more preferably an unsubstituted or alkyl group-containing norbornene (for example, norbornene (NB) or 8-ethyltetracyclododecene), an alkenyl group-containing norbornene (for example, ethylidenetetracyclododecene (8-ethylidenetetracyclododecene, ETD)), dicyclopentadiene (DCPD), an aromatic ring-containing norbornene derivative (for example, tetracyclo[9.2.1.0$^{2,1}$.0$^{3,8}$]tetradeca-3,5,7,12-tetraene (also referred to as 1,4-methano-1,4,4a,9a-tetrahydro-9H-fluorene (MTF))), or an unsubstituted or alkyl group-containing tetracyclododecene (for example, tetracyclododecene (TCD) or 8-methoxycarbonyl-8-methyltetracyclo[4.4.0.12,5.17,10]-3-dodecene (MTCD)).

One norbornene-based monomer may be used individually, or two or more norbornene-based monomers may be used in combination.

Note that the polycyclic norbornene-based monomer having three or more rings is inclusive of both endo and exo isomers and that either of these isomers may be used, or a mixture of these isomers may be used.

Other copolymerizable monomers can also be used so long as the effects disclosed herein are not lost. Other copolymerizable monomers preferably constitute 50 mol % or less when all monomers are taken to be 100 mol %.

Examples of other copolymerizable monomers include cycloolefins such as cyclobutene, cyclopentene, cyclohexene, 3,4-dimethylcyclopentene, 3-methylcyclohexene, 2-(2-methylbutyl)-1-cyclohexene, cyclooctene, and 3a,5,6,7a-tetrahydro-4,7-methano-1H-indene; and non-conjugated dienes such as 1,4-hexadiene, 4-methyl-1,4-hexadiene, 5-methyl-1,4-hexadiene, and 1,7-octadiene. One of these copolymerizable monomers may be used individually, or two or more of these copolymerizable monomers may be used in combination.

<Proportional Content of Naphthyl Group-Containing Alicyclic Compound (A)>

The proportion constituted by the naphthalene ring-containing alicyclic compound (A) in the mixed monomer is 20 mol % or more, and may preferably be 25 mol % or more, and more preferably 30 mol % or more. Moreover, the proportion constituted by the naphthalene ring-containing alicyclic compound (A) in the mixed monomer may be 100 mol % or less, 95 mol % or less, or 90 mol % or less, for example, and may preferably be 87 mol % or less, and more preferably 85 mol % or less. However, from a viewpoint of further improvement in terms of high refractive index, it is preferable that the mixed monomer includes the naphthyl group-containing alicyclic compound (A) and the norbornene-based monomer (B) and that the total proportional content of the naphthyl group-containing alicyclic compound (A) and the norbornene-based monomer (B) included in the mixed monomer is 100 mol %. In other words, it is preferable that monomer serving as a feedstock of the presently disclosed cycloolefin polymer consists of only the compound (A) and the monomer (B) and that the presently disclosed cycloolefin polymer only includes structural units derived from the compound (A) and the monomer (B).

<Percentage Hydrogenation>

The presently disclosed cycloolefin polymer is preferably a hydrogenated product and is more preferably sufficiently hydrogenated in order to improve stability and inhibit coloring and degradation caused by heat. The percentage hydrogenation of the presently disclosed cycloolefin polymer is preferably 90 mol % or more, more preferably 95 mol % or more, and even more preferably 99 mol % or more. When the value of the percentage hydrogenation is not less than any of the lower limits set forth above, heat resistance of the cycloolefin polymer can be increased. Note that the percentage hydrogenation of the polymer is the percentage hydrogenation of carbon-carbon double bonds in a main chain. Moreover, the naphthyl in a structure derived from the naphthyl group-containing alicyclic compound (A) is normally not hydrogenated.

<Structure of Cycloolefin Polymer>

The presently disclosed cycloolefin polymer is a polymer formed through polymerization of the above-described naphthyl group-containing alicyclic compound (A) and optionally other monomers.

Moreover, the presently disclosed cycloolefin polymer may preferably be a polymer formed through polymerization of the above-described naphthyl group-containing alicyclic compound (A), at least one norbornene-based monomer (B), and optionally other monomers. The polymerization may be ring-opening polymerization or addition polymerization, and, in a single cycloolefin polymer, both ring-opening polymerization and addition polymerization may be included. The polymerization is preferably ring-opening polymerization. The presently disclosed cycloolefin polymer can be expressed as a polymer that includes a structural unit derived from the compound (A) and optionally includes structural units derived from other monomers. Moreover, the presently disclosed cycloolefin polymer may preferably be expressed as a polymer that includes a structural unit derived from the compound (A) and a structural unit derived from the norbornene-based monomer (B) and that optionally includes structural units derived from other monomers. The proportion constituted by the structural unit derived from the compound (A) among all structural units is 20 mol % or more, and may preferably be 25 mol % or more, and more preferably 30 mol % or more. Moreover, the proportion constituted by the structural unit derived from the compound (A) among all structural units may be 100 mol % or less, 95 mol % or less, or 90 mol % or less, for example, and may preferably be 87 mol % or less, and more preferably 85 mol % or less. It is preferable that the total proportional content of the structural unit derived from the compound (A) and the structural unit derived from the norbornene-based monomer (B) among all structural units is 100%. In other words, the presently disclosed cycloolefin polymer preferably only includes structural units derived from the compound (A) and the monomer (B).

In a case in which the polymerization is ring-opening polymerization, the presently disclosed cycloolefin polymer can, for example, be expressed as a polymer that includes a structural unit (a) derived from the compound (A) and that optionally includes structural units derived from other monomers. Moreover, in a case in which the polymerization is ring-opening polymerization, the presently disclosed cycloolefin polymer may, for example, preferably be expressed as a polymer that includes a structural unit (a) derived from the compound (A) and a structural unit (b) derived from the norbornene-based monomer (B) and that optionally includes structural units derived from other monomers.

<Structural Unit (a) Derived from Compound (A)>

In the case of ring-opening polymerization, a structural unit represented by formula (5) is produced through a ring-opening reaction of the compound (A) (compound represented by formula (1)). By then further performing a hydrogenation reaction, a carbon-carbon double bond in a main chain of the structural unit represented by formula (5) is hydrogenated to thereby produce a structural unit represented by formula (6). Accordingly, in the case of ring-opening polymerization, the structural unit (a) derived from the compound (A) can be expressed as the structural unit represented by formula (5) in a situation in which a hydrogenation reaction is not performed and can be expressed as the structural unit represented by formula (6) or as a mixture (mixing ratio variable depending on degree of hydrogenation) of the structural unit represented by formula (5) and the structural unit represented by formula (6) in a situation in which a hydrogenation reaction is performed.

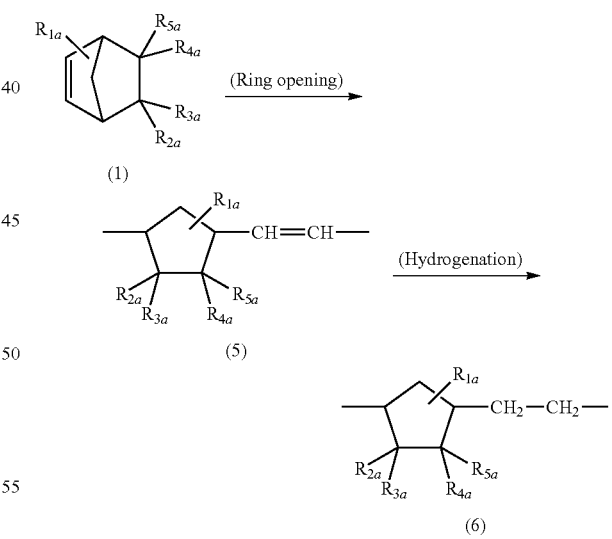

In the formulae, $R_{1a}$ to $R_{5a}$ are as previously described.

<Structural Unit (b) Derived from Norbornene-Based Monomer (B)>

In the case of ring-opening polymerization, a structural unit having a main structure represented by formula (7) is produced through a ring-opening reaction of the norbornene-based monomer (B) (compound having main structure represented by formula (2)). By then further performing a hydrogenation reaction, a carbon-carbon double bond in a main chain of the structural unit having a main structure represented by formula (7) is hydrogenated to thereby produce a structural unit having a main structure represented by formula (8). Accordingly, in the case of ring-opening polymerization, the structural unit (b) derived from the norbornene-based monomer (B) can be expressed as the structural unit having a main structure represented by formula (7) in a situation in which a hydrogenation reaction is not performed and can be expressed as the structural unit having a main structure represented by formula (8) or as a mixture (mixing ratio variable depending on degree of hydrogenation) of the structural unit having a main structure represented by formula (7) and the structural unit having a main structure represented by formula (8) in a situation in which a hydrogenation reaction is performed. In a case in which the norbornene-based monomer (B) includes a substituent and/or has a condensed ring formed with another ring, a substituent is included and/or a condensed ring is formed at a corresponding position in the structural unit (b). Examples of the substituent and condensed ring are as previously described.

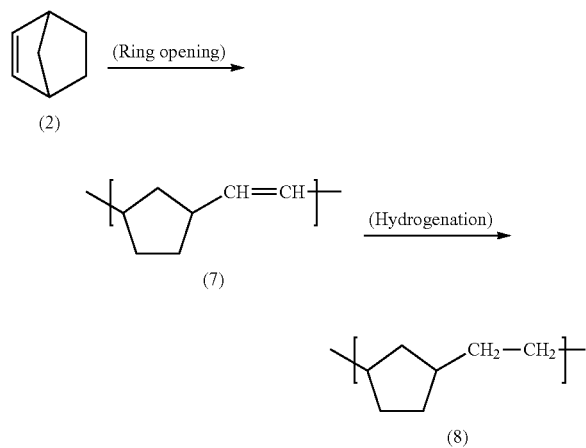

For example, when the norbornene-based monomer (B) is a monomer indicated by the previously described formula (3), the structural unit (b) derived from the norbornene-based monomer (B) can, in the case of ring-opening polymerization, be expressed as a structural unit represented by formula (9), a structural unit represented by formula (10), or a mixture thereof depending on whether or not hydrogenation is performed and on the degree of hydrogenation. In the formulae, $R^{1b}$ to $R^{3b}$ are as previously described.

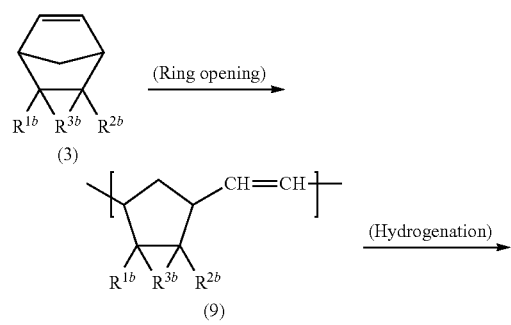

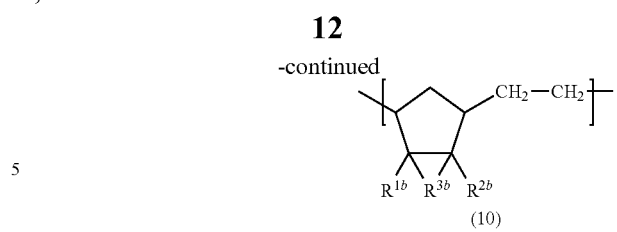

Moreover, when the norbornene-based monomer (B) is a monomer indicated by the previously described formula (3) or (4), for example, the structural unit (b) derived from the norbornene-based monomer (B) is, in the case of ring-opening polymerization, indicated by the following formula (9) or (10). In the formulae, $R^{1b}$ to $R^{7b}$ and m are as previously described.

Furthermore, when the norbornene-based monomer (B) is a monomer indicated by the previously described formula (4), for example, the structural unit (b) derived from the norbornene-based monomer (B) can, in the case of ring-opening polymerization, be expressed as a structural unit represented by formula (11), a structural unit represented by formula (12), or a mixture thereof depending on whether or not hydrogenation is performed and on the degree of hydrogenation. In the formulae, $R^{4b}$ to $R^{7b}$ and m are as previously described.

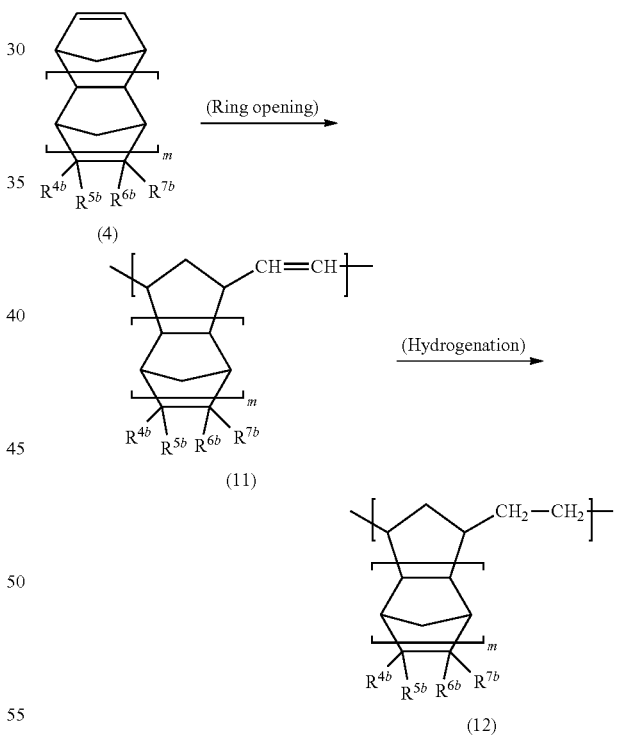

Specific examples of the structural unit (b) derived from the norbornene-based monomer (B) in the case of ring-opening polymerization correspond to structural units produced through ring opening and optional hydrogenation of the compounds listed as specific examples of the norbornene-based monomer (B).

The cycloolefin polymer may include other structural units so long as the effects disclosed herein are not lost. Examples of such other structural units include structural units derived from the other copolymerizable monomers that were previously described. One type of other structural unit may be included, or two or more types of other structural units may be included. The number of other structural units is preferably 50% or less when the number of all structural units is taken to be 100%.

<Average Molecular Weight of Cycloolefin Polymer>

The average molecular weight of the presently disclosed cycloolefin polymer can be expressed as a polystyrene-equivalent weight-average molecular weight (Mw) that is measured by gel permeation chromatography (GPC) using tetrahydrofuran (THF) as a solvent. The weight-average molecular weight (Mw) is normally 18,000 or more, and may preferably be 19,000 or more, and more preferably 20,000 or more. Moreover, the weight-average molecular weight (Mw) is normally 100,000 or less, and may preferably be 50,000 or less, and more preferably 40,000 or less.

A ratio (Mw/Mn) of the weight-average molecular weight (Mw) and the number-average molecular weight (Mn) is normally 4.0 or less, and may preferably be 3.7 or less, and more preferably 3.5 or less. The ratio (Mw/Mn) is 1.0 or more, and may be 1.0.

(Production Method of Cycloolefin Polymer)

<Production Method of Monomer>

Monomer serving as a feedstock of the presently disclosed cycloolefin polymer can be produced by a commonly known synthesis method, for example. For example, the naphthyl group-containing alicyclic compound (A) may be produced by palladium coupling (for example, a reaction of norbornadiene and bromonaphthalene) or a Diels-Alder reaction (for example, a reaction of cyclopentadiene and vinylnaphthalene). The production method of the naphthyl group-containing alicyclic compound (A) may, more specifically, be a method described in the EXAMPLES section. The naphthyl group-containing alicyclic compound (A) may be selectively obtained as an exo isomer or as an endo isomer, or may be obtained as a mixture of an exo isomer and an endo isomer.

<Production Method of Polymer>

In a case in which the presently disclosed cycloolefin polymer is a polymer, or hydrogenated product thereof, that includes structural units derived from the naphthyl group-containing alicyclic compound (A) and optionally other monomers, the presently disclosed cycloolefin polymer can be produced by a method including a step (polymerization step) of obtaining a polymer by performing polymerization (for example, ring-opening polymerization or addition polymerization) of:

a polymerization feedstock containing the naphthyl group-containing alicyclic compound (A) or a polymer including a structural unit derived from the compound (A), and optionally including other monomers or polymers including structural units derived from such monomers.

Moreover, in a case in which the presently disclosed cycloolefin polymer is a polymer, or hydrogenated product thereof, that includes structural units derived from the naphthyl group-containing alicyclic compound (A) and at least one norbornene-based monomer (B) differing from the compound (A) and that optionally includes structural units derived from other monomers, the presently disclosed cycloolefin polymer can be produced by a method including a step (polymerization step) of performing polymerization (for example, ring-opening polymerization or addition polymerization) of:

a polymerization feedstock containing the naphthyl group-containing alicyclic compound (A) or a polymer including a structural unit derived from the compound (A), containing at least one norbornene-based monomer (B) differing from the compound (A) or a polymer including a structural unit derived from the norbornene-based monomer (B), and optionally containing other monomers or polymers including structural units derived from such monomers; or a polymerization feedstock containing a polymer including a structural unit derived from the compound (A), a structural unit derived from the norbornene-based monomer (B), and optionally structural units derived from other monomers.

A proportion of the total number of moles of the compound (A) and the structural unit derived from the compound (A) relative to the total number of moles of all monomers and structural units in the polymerization feedstock is adjusted in accordance with the proportion constituted by the structural unit derived from the compound (A) among all structural units of the target cycloolefin polymer. For example, in order to produce a cycloolefin polymer in which the proportion constituted by the structural unit derived from the compound (A) among all structural units is not less than 20 mol % and not more than 100 mol %, and preferably not less than 20 mol % and not more than 90 mol %, a proportion of the total number of moles of the compound (A) and the structural unit derived from the compound (A) relative to the total number of moles of all monomers and structural units in the polymerization feedstock can be set as 20 mol % or more, and preferably as not less than 20 mol % and not more than 90 mol %.

The production method of the presently disclosed cycloolefin polymer may further include a step (hydrogenation step) of hydrogenating the polymer to obtain a hydrogenated product of the polymer. There are instances in which hydrogenation enhances characteristics such as heat resistance, weatherability, light resistance, solvent resistance, chemical resistance, and water resistance of the cycloolefin polymer.

The production method of the presently disclosed cycloolefin polymer may also further include a step (collection step) of collecting the polymer.

<Polymerization Step>

A polymerization unit compound that is contained in the polymerization feedstock may be either of a monomer or a polymer (inclusive of a copolymer). A polymer serving as a polymerization unit compound may be produced by the same polymerization reaction as in the polymerization step.

The polymerization reaction used in the polymerization step and in production of a polymer serving as a polymerization unit compound may be ring-opening polymerization or addition polymerization, for example. The following describes the polymerization reaction for the case of the polymerization step.

Ring-opening polymerization can be performed through ring-opening metathesis polymerization of the polymerization feedstock in the presence of a metathesis polymerization catalyst. The ring-opening metathesis polymerization may be performed in a reaction system in which the polymerization feedstock and the metathesis polymerization catalyst are mixed in a solvent (for example, an organic solvent). An activator, chain transfer agent, or other auxiliary agent (for example, a Lewis base) may be further provided in the reaction system in order to improve polymerization efficiency. The following describes reagents such as the catalyst used in ring-opening polymerization and various conditions of the reaction.

<Metathesis Polymerization Catalyst>

A transition metal imide complex represented by formula (1) is used as the metathesis polymerization catalyst.

$$M(NR^a)X_{4-p}(OR^b)_p \cdot L_q \quad (1)$$

In formula (1),

M is a metal atom selected from transition metal atoms of group 6 of the periodic table, $R^a$ is a phenyl group that is optionally substituted at one or more of the 3, 4, and 5 positions or a group represented by —$CH_2R^c$, where $R^c$ is a hydrogen atom, an optionally substituted alkyl group, or an optionally substituted aryl group, $R^b$ is an optionally substituted alkyl group or an optionally substituted aryl group, X is a halogen atom, an alkyl group, an aryl group, an aralkyl group, or an alkylsilyl group, L is an electron donating neutral ligand, p is 0 or 1, q is an integer of 0 to 2, each X may be the same or different in a case in which more than one X is present, and each L may be the same or different in a case in which more than one L is present.

<<Transition Metal Imide Complex>>

M in formula (1) is a transition metal atom of group 6 of the periodic table and can be selected from chromium, molybdenum, and tungsten. Of these metal atoms, molybdenum and tungsten are preferable, and tungsten is more preferable.

The transition metal imide complex of formula (1) includes a metal imide bond (N=$R^a$). $R^a$ is a substituent on a nitrogen atom that forms the metal imide bond.

$R^a$ in formula (1) is a phenyl group that is optionally substituted at one or more of the 3, 4, and 5 positions or a group represented by —$CH_2R^c$.

Examples of possible substituents of the phenyl group of $R^a$ that is optionally substituted at one or more of the 3, 4, and 5 positions include:

an alkyl group (for example, an alkyl group having a carbon number of 1 to 4 such as a methyl group or an ethyl group);

a halogen atom (for example, a fluorine atom, a chlorine atom, or a bromine atom); and an alkoxy group (for example, an alkoxy group having a carbon number of 1 to 4 such as a methoxy group, an ethoxy group, or an isopropoxy group).

Note that substituents present at two or more of the 3, 4, and 5 positions may be bonded to each other.

The phenyl group that is optionally substituted at one or more of the 3, 4, and 5 positions may be a phenyl group;

a monosubstituted phenyl group such as a 4-methylphenyl group, a 4-chlorophenyl group, a 3-methoxyphenyl group, a 4-cyclohexylphenyl group, or a 4-methoxyphenyl group;

a disubstituted phenyl group such as a 3,5-dimethylphenyl group, a 3,5-dichlorophenyl group, a 3,4-dimethylphenyl group, or a 3,5-dimethoxyphenyl group;

a trisubstituted phenyl group such as a 3,4,5-trimethylphenyl group or a 3,4,5-trichlorophenyl group; or an optionally substituted 2-naphthyl group such as a 2-naphthyl group, a 3-methyl-2-naphthyl group, or a 4-methyl-2-naphthyl group.

In the group represented by —$CH_2R^c$ of $R^a$, the carbon number of the optionally substituted alkyl group of $R^c$ is not specifically limited but is normally 1 to 20, preferably 1 to 10, and more preferably 1 to 4. This alkyl group may be linear or branched. Examples of possible substituents include, but are not specifically limited to, a phenyl group, an optionally substituted phenyl group (for example, a 4-methylphenyl group), and an alkoxy group (for example, an alkoxy group having a carbon number of 1 to 4 such as a methoxy group or an ethoxy group).

The optionally substituted aryl group of $R^c$ may be a phenyl group, a 1-naphthyl group, a 2-naphthyl group, or the like. Examples of possible substituents include, but are not specifically limited to, a phenyl group, an optionally substituted phenyl group (for example, a 4-methylphenyl group), and an alkoxy group (for example, an alkoxy group having a carbon number of 1 to 4 such as a methoxy group or an ethoxy group).

$R^c$ is preferably an alkyl group having a carbon number of 1 to 20 such as a methyl group, an ethyl group, a propyl group, an isopropyl group, a butyl group, an isobutyl group, a t-butyl group, a pentyl group, a hexyl group, an octyl group, or a decyl group.

Note that "4-p" in formula (1) is 4 or 3, and thus four or three X groups are present in formula (1). X is a halogen atom, an alkyl group, an aryl group, an aralkyl group, or an alkylsilyl group. Each X may be the same or different.

In the case of X, the halogen atom may be a chlorine atom, a bromine atom, or an iodine atom. The alkyl group may be a methyl group, an ethyl group, a propyl group, an isopropyl group, a butyl group, an isobutyl group, a t-butyl group, a pentyl group, a neopentyl group, or the like.

The aryl group may be a phenyl group, a 4-methylphenyl group, a 2,6-dimethylphenyl group, a 1-naphthyl group, a 2-naphthyl group, or the like.

The aralkyl group may be a benzyl group, a neophyl group, or the like.

The alkylsilyl group may be a trimethylsilyl group, a triethylsilyl group, a t-butyldimethylsilyl group, or the like.

Note that p in formula (1) is 0 or 1, and thus one metal alkoxide bond or one metal aryloxide bond ($OR^b$) may be present in formula (1). $R^b$ is a substituent on an oxygen atom that forms the metal alkoxide bond or metal aryloxide bond.

$R^b$ is an optionally substituted alkyl group or an optionally substituted aryl group, and the examples and preferred examples of the optionally substituted alkyl group and the optionally substituted aryl group of $R^C$ described above are applicable thereto.

Note that q in formula (1) is an integer of 0 to 2, and thus one or two electron donating neutral ligands (L) may be present in formula (1).

L may be an electron donating compound that includes an atom from group 14 or 15 of the periodic table and may be:

a phosphine such as trimethylphosphine, triisopropylphosphine, tricyclohexylphosphine, or triphenylphosphine;

an ether such as diethyl ether, dibutyl ether, 1,2-dimethoxyethane, tetrahydrofuran, or tetrahydropyran; or an amine such as trimethylamine, triethylamine, pyridine, or lutidine.

Of these examples, ethers are preferable.

The transition metal imide complex of formula (1) is preferably a tungsten imide complex that includes a phenyl imide group (tungsten imide complex for which M is a tungsten atom and $R^a$ is a phenyl group in formula (1)), and is more preferably tetrachlorotungsten phenylimide (tetrahydrofuran) or tetrachlorotungsten phenylimide (tetrahydropyran).

One transition metal imide complex of formula (1) may be used individually, or two or more transition metal imide complexes of formula (1) may be used in combination.

The transition metal imide complex of formula (1) can be synthesized, for example, by a method in which an oxyhalide of a group 6 transition metal and a phenyl isocyanate that is optionally substituted at one or more of the 3, 4, and 5 positions or a monosubstituted methyl isocyanate are mixed with, as necessary, an electron donating neutral ligand (L), an alcohol, a metal alkoxide, and a metal aryloxide (for example, a method described in JP-H5-345817A). The synthesized transition metal imide complex may be purified or isolated by crystallization or the like and then be used in the ring-opening polymerization reaction, or the obtained mixture may be used in that form as a catalyst liquid without purification.

The amount of the transition metal imide complex of formula (1) that is used relative to 100 mol % of norbornene-based monomer can be set as not less than 0.00005 mol % and not more than 1 mol %, and is preferably not less than 0.0001 mol % and not more than 0.2 mol %, and more preferably not less than 0.0002 mol % and not more than 0.1 mol %. When the amount is within any of the ranges set forth above, it is possible to sufficiently avoid complication of catalyst removal and to obtain sufficient polymerization activity.

<<Activator>>

Although the transition metal imide complex of formula (1) displays catalytic activity by itself, the transition metal imide complex may be combined with an activator so as to obtain a polymerization catalyst having higher activity.

The activator may be a compound of any of groups 1, 2, 12, 13, and 14 of the periodic table that includes a hydrocarbon group having a carbon number of 1 to 20 (for example, an alkyl group). Of such compounds, it is preferable to use an organolithium, organomagnesium, organozinc, organoaluminum, or organotin, and particularly preferable to use an organoaluminum or organotin.

The organolithium may be methyllithium, n-butyllithium, phenyllithium, or the like.

The organomagnesium may be butylethylmagnesium, butyloctylmagnesium, dihexylmagnesium, ethylmagnesium chloride, n-butylmagnesium chloride, allylmagnesium bromide, or the like.

The organozinc may be dimethylzinc, diethylzinc, diphenylzinc, or the like.

The organoaluminum may be trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide, or the like.

The organotin may be tetramethyltin, tetra(n-butyl)tin, tetraphenyltin, or the like.

One activator may be used individually, or two or more activators may be used in combination.

In a situation in which an activator is used, the used amount thereof relative to the transition metal imide complex of formula (1) can be set as not less than 0.1 molar equivalents and not more than 100 molar equivalents, and is preferably not less than 0.2 molar equivalents and not more than 50 molar equivalents, and more preferably not less than 0.5 molar equivalents and not more than 20 molar equivalents. When the amount is within any of the ranges set forth above, it is possible to sufficiently obtain improvement of polymerization activity through use of the activator and to sufficiently avoid the occurrence of side reactions.

<<Other Auxiliary Agents>>

A Lewis base may be further added in order to control the polymerization rate or the molecular weight distribution of the obtained polymer.

The Lewis base may be an ether such as diethyl ether or tetrahydrofuran; a ketone such as acetone or cyclohexanone; a nitrile such as acetonitrile or benzonitrile; an amine such as triethylamine or N,N-diethylaniline; a pyridine such as pyridine or lutidine; a phosphine such as triphenylphosphine; an amide such as dimethylformamide; a sulfoxide such as dimethyl sulfoxide; a phosphine oxide such as triphenylphosphine oxide; an ester such as ethyl acetate; or the like. Of these Lewis bases, ethers, pyridines, and nitriles are preferable. One Lewis base may be used individually, or two or more Lewis bases may be used in combination.

In a situation in which a Lewis base is used, the used amount thereof relative to the transition metal imide complex of formula (1) can be set as not less than 0.1 molar equivalents and not more than 1,000 molar equivalents, and is preferably not less than 0.2 molar equivalents and not more than 500 molar equivalents, and more preferably not less than 0.5 molar equivalents and not more than 200 molar equivalents.

<Chain Transfer Agent>

A chain transfer agent can be used in the polymerization reaction. By using a chain transfer agent, it is possible to adjust the molecular weight of the obtained ring-opened polymer and to effectively reduce the content ratio of dimers and the like.

The chain transfer agent may be an α-olefin, an internal olefin, an aromatic vinyl compound, or the like. An internal olefin is a compound that includes a double bond in an inner section of an olefin chain, rather than at the end of the olefin chain. The term "aromatic vinyl compound" is inclusive of compounds having a substituent (for example, an alkyl group) on a vinyl group.

The α-olefin may be an alkene that has a carbon number of 2 to 20 and that includes a double bond at the α position, examples of which include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene.

The internal olefin may be 2-butene, 3-hexene, or the like.

The aromatic vinyl compound may be styrene, α-methylstyrene, 2-methylstyrene, 3-methyl styrene, 4-methyl styrene, 2,4-diisopropylstyrene, 2,4-dimethylstyrene, 4-t-butylstyrene, or the like.

Of these chain transfer agents, 1-hexene, styrene, and 1-decene are preferable in terms of reactivity and molecular weight control, with 1-hexene and styrene being more preferable.

One chain transfer agent may be used individually, or two or more chain transfer agents may be used in combination.

In a situation in which a chain transfer agent is used, the amount of the chain transfer agent that is used can be set as not less than 0.1 mol % and less than 15 mol % relative to 100 mol % of norbornene-based monomer. When the amount is within the range set forth above, effects caused by use of the chain transfer agent are sufficiently obtained. From a viewpoint of reducing the content ratio of dimers and the like, the chain transfer agent is preferably not less than 0.3 mol % and less than 10 mol %, more preferably not less than 0.5 mol % and not more than 9 mol %, and even more preferably not less than 1 mol % and not more than 6 mol %.

<Organic Solvent>

The polymerization reaction is normally carried out in an organic solvent.

The organic solvent is not specifically limited so long as it is inert in the reaction and so long as a norbornene-based monomer and a target norbornene-based polymer can be dissolved or dispersed therein, and examples thereof include:

aliphatic hydrocarbons such as pentane, hexane, and heptane;

alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, and xylene; halogenated aliphatic hydrocarbons such as dichloromethane, chloroform, and 1,2-dichloroethane;

halogenated aromatic hydrocarbons such as chlorobenzene and dichlorobenzene;

nitrogen-containing hydrocarbon solvents such as nitromethane, nitrobenzene, and acetonitrile;

ethers such as diethyl ether and tetrahydrofuran; and mixtures of any of the preceding organic solvents.

Of these solvents, aromatic hydrocarbons, aliphatic hydrocarbons, alicyclic hydrocarbons, and ethers are preferable.

One organic solvent may be used individually, or two or more organic solvents may be used in combination.

The organic solvent may be used in an amount such that the concentration of norbornene-based monomer is not less than 1 mass % and not more than 50 mass %, preferably not less than 2 mass % and not more than 45 mass %, and more preferably not less than 3 mass % and not more than 40 mass %. An amount that is within any of the ranges set forth above allows sufficient productivity and is also convenient in terms of handleability.

<Conditions of Polymerization Reaction>

Although the polymerization reaction can be performed by stirring a norbornene-based monomer, the transition metal imide complex of formula (1), and the optional activator and chain transfer agent, normally in an organic solvent, a feature herein is that at least some of the norbornene-based monomer is added continuously in the polymerization reaction.

Components other than the norbornene-based monomer that is continuously added may be loaded into and stirred in a reactor in advance. Stirring of the reaction liquid inside the reactor can be continued during continuous addition of the norbornene-based monomer so as to cause the polymerization reaction to progress.

The norbornene-based monomer that is continuously added may be all or some of the norbornene-based monomer. In terms of reaction selectivity and reaction stability, it is preferable that some of the norbornene-based monomer is continuously added and that the remainder of the norbornene-based monomer is loaded into the reactor in advance. The amount of the norbornene-based monomer that is loaded into the reactor in advance, when the total amount of the norbornene-based monomer is taken to be 100 mass %, can be set as not less than 0.1 mass % and not more than 70 mass %, and is preferably not less than 0.5 mass % and not more than 50 mass %, and more preferably not less than 1 mass % and not more than 35 mass %. An amount that is within any of the ranges set forth above facilitates control of the weight-average molecular weight of the obtained polymer.

The continuous addition of the norbornene-based monomer can be performed through continuous dropwise addition of a liquid having the norbornene-based monomer dissolved or dispersed in the previously described organic solvent. The concentration of the norbornene-based monomer in this liquid can be set as not less than 1 mass % and not more than 50 mass %, and is preferably not less than 2 mass % and not more than 45 mass %, and more preferably not less than 3 mass % and not more than 40 mass %. An amount that is within any of these ranges allows sufficient productivity and is also convenient in terms of handleability.

The duration of the continuous addition can be set as not less than 20 minutes and not more than 200 minutes. In terms of control of stereochemistry, the duration is preferably not less than 40 minutes and not more than 180 minutes, and more preferably not less than 60 minutes and not more than 160 minutes.

The polymerization temperature can be set as not lower than 20° C. and not higher than 60° C. In terms of control of stereochemistry, the polymerization temperature is preferably not lower than 25° C. and not higher than 55° C., and more preferably not lower than 30° C. and not higher than 50° C.

The temperature of the continuously added norbornene-based monomer can be set as not lower than 20° C. and not higher than 60° C. In terms of control of stereochemistry, this temperature is preferably not lower than 22.5° C. and not higher than 50° C., and more preferably not lower than 25° C. and not higher than 45° C.

In terms of control of molecular weight, it is preferable that the continuous addition of the norbornene-based monomer is performed such that the polymerization conversion rate of norbornene-based monomer in the polymerization reaction system at the time at which continuous addition ends is 40% or more. The polymerization conversion rate is more preferably 60% or more. The polymerization conversion rate can be controlled by adjusting conditions of the addition such as the rate of addition of the norbornene-based monomer and by adjusting conditions of the polymerization reaction such as the polymerization temperature. When conditions other than the rate during addition are the same, the polymerization conversion rate tends to increase with a higher rate and tends to decrease with a lower rate. Moreover, the polymerization conversion rate tends to increase with a higher temperature and tends to decrease with a lower temperature. Although no specific limitations are placed on the upper limit, the conversion rate is normally 99% or less.

Once the continuous addition ends, stirring of the reaction liquid is continued, and the polymerization reaction is then ended. The duration of stirred mixing after the end of addition can be set as not less than 15 minutes and not more than 300 minutes. In terms of polymerization conversion rate and productivity, the duration is preferably not less than 20 minutes and not more than 270 minutes, and more preferably not less than 30 minutes and not more than 240 minutes.

At least some of the transition metal imide complex may also be continuously added. This is expected to provide reaction selectivity. The continuous addition of the transition metal imide complex can be performed through continuous dropwise addition of a liquid having the transition metal imide complex dissolved or dispersed in the previously described organic solvent. The concentration of the transition metal imide complex in this liquid can be set as not less than 0.01 mass % and not more than 20 mass %. In terms of solution stability of the complex, the concentration is preferably not less than 0.1 mass % and not more than 15 mass %, and more preferably not less than 0.5 mass % and not more than 10 mass %. The timing of this continuous addition may be the same as the timing of continuous addition of the norbornene-based monomer or may be a different timing.

In a situation in which a chain transfer agent is used, the amount thereof can be set as an amount such that the amount of continuous addition of the norbornene-based polymer is 0.060 mol/min or more and preferably 0.080 mol/min or more per 1 mol of the chain transfer agent, and can be set as an amount such that the amount of continuous addition of the norbornene-based polymer is 2.000 mol/min or less and preferably 1.000 mol/min or less per 1 mol of the chain transfer agent from a viewpoint of control of stereochemistry and reduction of the content ratio of dimers and the like.

The addition polymerization can be performed in the presence of a Ziegler-Natta catalyst, a metallocene catalyst, a nickel catalyst, or a palladium catalyst, for example. Moreover, the addition polymerization may be performed under reaction conditions that are modified as appropriate from commonly known reaction conditions.

<Hydrogenation Step>

The norbornene-based polymer that is obtained through the polymerization step includes carbon-carbon double bonds in a main chain thereof. Moreover, depending on the types of monomers used in polymerization, a carbon-carbon double bond may also be present in a substituent bonded to the main chain or a 5-membered ring or in a condensed ring with a 5-membered ring (hereinafter, these are referred to as side chains). Hydrogenation of the norbornene-based polymer yields a hydrogenated product in which these carbon-carbon double bonds have been hydrogenated to form saturated bonds. There are instances in which conversion to a hydrogenated product enhances characteristics such as heat resistance, weatherability, light resistance, solvent resistance, chemical resistance, and water resistance. A commonly known method can be adopted as the method of hydrogenation. For example, the hydrogenation can be performed by supplying hydrogen to a solution of the norbornene-based polymer and performing an addition reaction in the presence of a hydrogenation catalyst. The hydrogenation catalyst is preferably a catalyst that hydrogenates carbon-carbon double bonds in a main chain and that does not hydrogenate a naphthalene ring of a naphthyl group. Examples of such hydrogenation catalysts include ruthenium catalysts (chlorohydridocarbonyltris(triphenylphosphine)ruthenium) and palladium catalysts. Supply of hydrogen may be performed by adding hydrogen at high pressure (for example, 1 MPa or higher) and performing stirring at high temperature (for example, 120° C. or higher).

<Collection Step>

A norbornene-based polymer that is obtained through the polymerization step or a hydrogenated product that is obtained through the hydrogenation step can be collected as the cycloolefin polymer. For example, the reaction solution can be mixed with a precipitant (for example, a poor solvent such as isopropanol or methanol) to cause precipitation of the cycloolefin polymer, and then the cycloolefin polymer can be collected as a precipitate. The collected cycloolefin polymer may then be dried (for example, vacuum dried).

(Physical Properties of Cycloolefin Polymer)

<Refractive Index>

The refractive index can vary depending on wavelength and temperature. Although the refractive index may be measured under any wavelength and temperature conditions, the refractive index ($n_d$) for light having a wavelength of 587.6 nm at 25° C. is used as the refractive index in the present specification. The refractive index ($n_d$) of the presently disclosed cycloolefin polymer is preferably 1.545 or more, and more preferably 1.550 or more in order to cause the display of an optical function of an optical element. Moreover, the refractive index ($n_d$) of the presently disclosed cycloolefin polymer is preferably 1.640 or less, and more preferably 1.635 or less in order to display a function of an optical element.

<Abbe Number>

The Abbe number is a value that is calculated based on the refractive indices for three wavelengths. Although there are various definitions of the Abbe number depending on the combination of wavelengths, the Abbe number ($v_d$) defined by equation (1), shown below, is used as the Abbe number in the present specification.

$$v_d = (n_d - 1)/(n_F - n_c) \quad (1)$$

In equation (1), $n_d$, $n_c$, and $n_F$ respectively represent the refractive indices for wavelengths of 587.6 nm, 656.3 nm, and 486.1 nm at 25° C.

The Abbe number ($v_d$) of the presently disclosed cycloolefin polymer is preferably 20 or more, and more preferably 21 or more. Moreover, the Abbe number ($v_d$) of the presently disclosed cycloolefin polymer is preferably 50 or less, and more preferably 49 or less in order to reduce chromatic aberration of an optical element.

<Stress Birefringence>

The stress birefringence ($C_R$) can be determined by applying stress (F) to a measurement sample, subsequently measuring the in-plane retardation (Re(b) [nm]) at a specific wavelength (for example, a wavelength of 543 nm) and thickness (T(b) [mm]) of a central section of the measurement sample, and then calculating a δn value by equations (X1) and (X2), shown below.

$$\delta n = \mathrm{Re}(b) \times (1/T(b)) \times 10^{-6} \quad (X1)$$

$$C_R = \delta n / F \quad (X2)$$

A δn value of closer to 0 indicates less birefringence. Moreover, a positive value is exhibited in a case in which the slow axis is the stretching direction, whereas a negative value is exhibited in a case in which the slow axis is orthogonal to the stretching direction. The stress birefringence ($C_R$) of the presently disclosed cycloolefin polymer is preferably $-500 \times 10^{-12}$ Pa$^{-1}$ or more, and more preferably $-400 \times 10^{-12}$ Pa$^{-1}$ or more. Moreover, the stress birefringence ($C_R$) of the presently disclosed cycloolefin polymer is preferably $1,400 \times 10^{-12}$ Pa$^{-1}$ or less, and more preferably $900 \times 10^{-12}$ Pa$^{-1}$ or less in order to suppress variation of optical element quality.

<Glass-Transition Temperature>

The glass-transition temperature of the presently disclosed cycloolefin polymer can, for example, be not lower than 40° C. and not higher than 200° C. Note that the glass-transition temperature can be controlled based on adjustment of the chemical composition of a monomer composition used in synthesis of the presently disclosed cycloolefin polymer, for example.

(Use of Cycloolefin Polymer)

<Composition>

The presently disclosed cycloolefin polymer can be used in the form of a composition. The composition contains the presently disclosed cycloolefin polymer and optionally further contains a solvent and additives such as a weathering stabilizer, a heat resistance stabilizer, an antistatic agent, a flame retardant, a slip agent, an anti-blocking agent, an antifogging agent, a lubricant, a dye, a pigment, a natural oil, a synthetic oil, a wax, and/or a filler.

Note that the presently disclosed cycloolefin polymer can be mixed with the additives and/or solvent by a known mixing method.

The additives may, more specifically, be any of the additives given as examples in JP2005-330465A, for example. The solvent may be a known solvent such as any of the previously described organic solvents.

The presently disclosed cycloolefin polymer or the composition containing the presently disclosed cycloolefin polymer can be advantageously used as a material of an optical element or the like.

<Shaped Product>

The presently disclosed cycloolefin polymer can be used in the form of a shaped product. The shaped product is obtained through shaping of the presently disclosed cycloolefin polymer or the composition that contains the presently disclosed cycloolefin polymer. Moreover, the shaped product obtained from the presently disclosed cycloolefin polymer can advantageously be used as an optical element or the like.

Examples of methods by which the shaped product may be shaped include injection molding, extrusion blow molding, injection blow molding, two-stage blow molding, multilayer blow molding, connection blow molding, stretch blow molding, rotational molding, vacuum forming, extrusion molding, calendering, solution casting, hot press forming, and inflation.

EXAMPLES

The following provides a more specific description of the present disclosure based on examples. However, the present disclosure is not limited to the following examples.

<Evaluation Methods of Physical Properties>

Measurements of various physical properties were performed according to the following methods.

(Measurement Method of Weight-Average Molecular Weight Mw)

Weight-average molecular weight Mw was determined as a standard polyisoprene-equivalent value through measurement by gel permeation chromatography (GPC) using cyclohexane as an eluent.

The standard polyisoprene was standard polyisoprene produced by Tosoh Corporation. In a case in which the sample did not dissolve in cyclohexane, the weight-average molecular weight Mw was determined as a standard polystyrene-equivalent value through measurement by GPC using tetrahydrofuran (THF) as an eluent. The standard polystyrene was standard polystyrene produced by Tosoh Corporation.

(Measurement Method of Glass-Transition Temperature)

Glass-transition temperature (Tg) was measured based on JIS K 6911 with a heating rate of 10° C./min using a differential scanning calorimeter (produced by Nanotechnology; product name: DSC6220SII).

(Measurement Method of Stress Birefringence $C_R$ of Polymer)

A polymer was shaped into a sheet form of 35 mm (length)×10 mm (width)×1 mm (thickness) so as to obtain a sample sheet. Both ends of the sample sheet were secured with clips, and then a 55 g weight was secured to one of the clips. Next, the sample sheet was suspended with the clip to which the weight was not secured as an origin inside an oven set to a temperature equal to "polymer glass-transition temperature (Tg)+15° C." for 1 hour so as to perform stretching treatment. Thereafter, the sample sheet was slowly cooled and restored to room temperature to obtain a measurement sample.

The in-plane retardation (Re(b) [nm]) of a central section of the measurement sample was measured at a measurement wavelength of 543 nm using a birefringence meter (WPA-100 produced by Photonic Lattice, Inc.). In addition, the thickness (T(b) [mm]) of the central section of the measurement sample was measured. These measurement values Re(b) and T(b) were used to calculate a δvalue by equation (X1), shown below.

$$\delta n = Re(b) \times (1/T(b)) \times 10^{-6} \quad (X1)$$

This δn value and the stress (F) applied to the sample were then used to calculate the stress birefringence ($C_R$) by equation (X2), show below.

$$C_R = \delta n/F [Pa^{-1}] \quad (X2)$$

A δn value of closer to 0 indicates less birefringence. Moreover, a positive value is exhibited in a case in which the slow axis is the stretching direction, whereas a negative value is exhibited in a case in which the slow axis is orthogonal to the stretching direction.

(Refractive Index Measurement)

A measurement sample was obtained by shaping a sheet of 5 mm in thickness and then leaving this sheet in an atmosphere having a temperature of (glass-transition temperature (Tg)–15°) C for 20 hours.

The refractive index ($n_d$, $n_c$, and $n_F$) of the obtained measurement sample was measured at 25° C. using a precision refractometer (produced by Shimadzu Corporation; product name: KPR-200; light source: He lamp (wavelength: 587.6 nm) and H2 lamp (wavelength: 656.3 nm and 486.1 nm)). The table shows the refractive index for light having a wavelength of 587.6 nm.

(Abbe Number Measurement)

Refractive indices ($n_d$, $n_c$, and $n_F$) at 25° C. that were determined through refractive index measurement were used to calculate the Abbe number ($v_d$) according to equation (1), shown below.

$$v_d = (n_d - 1)/(n_F - n_c) \quad (1)$$

In equation (1), $n_d$, $n_c$, and $n_F$ respectively represent the refractive indices for wavelengths of 587.6 nm, 656.3 nm, and 486.1 nm.

Synthesis Example 1: Production Method of Exo-1-Naphthylnorbornene Monomer

After charging 458 g of 1-bromonaphthalene (produced by Wako Pure Chemical Industries, Ltd.), 500 mL of dimethylformamide (produced by Wako Pure Chemical Industries, Ltd.), 455 mL of norbornadiene (produced by Tokyo Chemical Industry Co., Ltd.), 656 mL of piperidine (produced by Wako Pure Chemical Industries, Ltd.), 220 mL of formic acid (99%; produced by Wako Pure Chemical Industries, Ltd.), and 2.75 g of a palladium catalyst (bis(triphenylphosphine)palladium dichloride; produced by Tokyo Chemical Industry Co., Ltd.; product code: B1667), these materials were stirred at 90° C. for 6.5 hours. The reaction liquid was extracted with ethyl acetate/water, and the organic layer was dried using magnesium sulfate. The dried organic layer was then subjected to filtration and evaporation. Column chromatography (eluent solvent: hexane) of remaining material was then performed so as to remove palladium residue. The resultant solution was subjected to evaporation, and then the remaining liquid was subjected to distillation under reduced pressure (1.2 mm Hg/135° C. to 152° C.). This yielded 269 g of exo-1-naphthylnorbornene (exo-1-NaphNB) represented by the following formula as a colorless transparent liquid.

When the peak purity of the product was measured in gas chromatography, the purity was 95.0%.

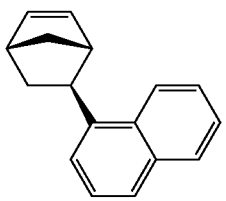 [SMILES: C1=C[C@H]2C[C@@H]1C[C@@H]2c1cccc2ccccc12]

Synthesis Example 2: Production Method of Exo-2-Naphthylnorbornene Monomer

After charging 458 g of 2-bromonaphthalene (produced by Wako Pure Chemical Industries, Ltd.), 500 mL of dimethylformamide (produced by Wako Pure Chemical Industries, Ltd.), 455 mL of norbornadiene (produced by Tokyo Chemical Industry Co., Ltd.), 656 mL of piperidine (produced by Wako Pure Chemical Industries, Ltd.), 220 mL of formic acid (99%; produced by Wako Pure Chemical Industries, Ltd.), and 2.75 g of a palladium catalyst (bis(triphenylphosphine)palladium dichloride; produced by Tokyo Chemical Industry Co., Ltd.; product code: B1667), these materials were stirred at 90° C. for 6.5 hours. The reaction liquid was extracted with ethyl acetate/water, and the organic layer was dried using magnesium sulfate. The dried organic layer was then subjected to filtration and evaporation. Column chromatography (eluent solvent: hexane) of remaining material was then performed so as to remove palladium residue. The resultant solution was subjected to evaporation, and then the remaining liquid was subjected to distillation under reduced pressure (1.2 mm Hg/135° C. to 152° C.). This yielded 269 g of exo-2-naphthylnorbornene (exo-2-NaphNB) represented by the following formula as a colorless transparent liquid.

When the peak purity of the product was measured in gas chromatography, the purity was 95.0%.

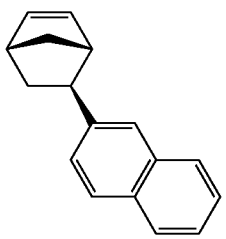 [SMILES: C1=C[C@H]2C[C@@H]1C[C@@H]2c1ccc2ccccc2c1]

Example 1: Production and Evaluation of Norbornene-Based Polymer (1-1) Production of Ring-Opened Polymer After loading 96 g of dehydrated toluene, 2 mol % of 1-hexene, and 1.2 mol % of diethylaluminum ethoxide (Et$_2$Al(OEt)) into a glass reactor that had been internally purged with nitrogen and then mixing these materials at room temperature, all of 0.4 mol % of a 2.0 weight % toluene solution of tetrachlorotungsten phenylimide (tetrahydrofuran) (complex 1) was loaded into the reactor while maintaining a temperature of 50° C., and then a mixed monomer of exo-2-naphthylnorbornene and tetracyclododecene (TCD) (molar ratio=56:44; 0.03 mol in total) was continuously added over 2 hours to perform ring-opening polymerization. Next, 48 mol % of isopropyl alcohol was added to the polymerization solution so as to deactivate the polymerization catalyst and terminate the polymerization reaction. The total amount of the reaction solution was 121 g. The weight-average molecular weight Mw of the obtained ring-opened polymer was $2.5 \times 10^4$. Moreover, the conversion rate of monomer to polymer was 100%. Note that "mol %" in the preceding description indicates a percentage value based on the number of moles of the mixed monomer.

(1-2) Production of Norbornene-Based Polymer Through Hydrogenation

Next, 155 g of cyclohexane was added to 95 g of the reaction solution containing the ring-opened polymer obtained in step (1-1), 0.05 weight % of chlorohydridocarbonyltris(triphenylphosphine)ruthenium was further added as a hydrogenation catalyst, the pressure was raised to 4.5 MPa with hydrogen, heating was performed to a temperature of 160° C. under stirring, and then a reaction was carried out for 8 hours to yield a reaction solution containing a hydrogenated exo-2-naphthylnorbornene/TCD ring-opened copolymer. The obtained solution was poured into a large amount of isopropanol to cause precipitation of a norbornene-based polymer as a hydrogenated product of a ring-opened polymer. The norbornene-based polymer that had precipitated was filtered off and was then dried in a vacuum dryer (200° C., 1 Torr) for 10 hours to yield 5 g of the norbornene-based polymer. The weight-average molecular weight of the norbornene-based polymer was $3.04 \times 10^4$.

(1-3) Evaluation of Norbornene-Based Polymer

The glass-transition temperature (Tg), stress birefringence ($C_R$), refractive index ($n_d$), and Abbe number ($v_d$) of the obtained norbornene-based polymer were measured by the previously described methods. The results are shown in Table 1.

Examples 2 to 7 and Comparative Example 1: Production and Evaluation of Norbornene-Based Polymer Production and evaluation of a norbornene-based polymer were performed in the same way as in Example 1 with the exception that the types and composition ratio of monomer compounds in the mixed monomer were set as indicated in Table 1 or that a monomer compound indicated in Table 1 was used instead of the mixed monomer. The evaluation results are shown in Table 1.

TABLE 1

Monomer chemical composition and various physical property values of norbornene-based polymers

| | | Example 1 | Example 2 | Example 3 | Example 4 | Example 5 | Example 6 | Example 7 | Comparative Example 1 |
|---|---|---|---|---|---|---|---|---|---|
| Used resin (norbornene-based polymer) | Monomer: chemical composition | exo-2-NaphNB/ TCD | exo-2-NaphNB/ TCD | exo-2-NaphNB/ TCD | exo-1-NaphNB/ TCD | exo-1-NaphNB/ MTCD | exo-1-NaphNB/ TCD/MTF | exo-2-NaphNB | exo-1-NaphNB/ MTCD |
| | Monomer: molar ratio | 56/44 | 83/17 | 20/80 | 47/53 | 47/53 | 83/13/4 | 100/0 | 19/81 |
| | Monomer: weight ratio | 64/36 | 87/13 | 26/74 | 55/45 | 46/54 | 1987/10/3 | 100/0 | 18/82 |

TABLE 1-continued

Monomer chemical composition and various physical property values of norbornene-based polymers

| | | Example 1 | Example 2 | Example 3 | Example 4 | Example 5 | Example 6 | Example 7 | Comparative Example 1 |
|---|---|---|---|---|---|---|---|---|---|
| Physical values property | Glass-transition temperature (Tg) [° C.] | 124.9 | 105.8 | 151.3 | 138.3 | 138.4 | 128 | 93 | 149 |
| | Weight-average molecular weight (Mw) | 30400 | 21300 | 33100 | 32300 | 35500 | 31300 | 22700 | 182200 |
| Evaluation results | Birefringence expression (CR value) | 260 | −70 | 821 | 398 | 950 | 10 | −259 | 1650 |
| | Refractive index (nd) | 1.569 | 1.618 | 1.56 | 1.591 | 1.577 | 1.62 | 1.63 | 1.541 |
| | Abbe number (vd) | 42 | 23 | 46 | 34 | 39 | 23 | 28 | 53 |

Abbreviations of compound names used in Table 1 are as follows.
exo-2-NaphNB: exo-2-naphthylnorbornene
exo-1-NaphNB: exo-1-naphthylnorbornene
TCD: tetracyclododecene
MTCD: 8-methoxycarbonyl-8-methyltetracyclo[4.4.0.1$^{2,5}$.1$^{7,10}$]-3-dodecene
MTF: 1,4-methano-1,4,4a,9a-tetrahydro-9H-fluorene

INDUSTRIAL APPLICABILITY

According to the present disclosure, it is possible to provide a cycloolefin polymer simultaneously having a high refractive index, a low Abbe number, and low birefringence.

Moreover, according to the present disclosure, it is possible to provide a composition that can advantageously be used as a material of an optical element or the like and a shaped product that can advantageously be used as an optical element or the like.

The invention claimed is:

1. A cycloolefin polymer that is a ring-opened polymer or a hydrogenated product thereof, said polymer comprising a structural unit derived from a naphthyl group-containing alicyclic compound (A) represented by following formula (1):

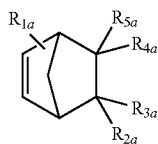

(1)

where any one of $R_{2a}$ to $R_{5a}$ is a naphthyl group and remaining groups among $R_{2a}$ to $R_{5a}$ and $R_{1a}$ are each independently:
(i) a hydrogen atom;
(ii) a halogen atom; or
(iii) a substituted or unsubstituted hydrocarbon group having a carbon number of 1 to 30 and optionally having a linking group comprising an oxygen atom, a nitrogen atom, a sulfur atom or a silicon atom, except for the hydrocarbon group comprising an aromatic ring; and
a structural unit derived from at least one norbornene-based monomer (B) different from the compound (A), wherein the norbornene-based monomer (B) comprises:
(i) a norbornene that is unsubstituted or has an alkyl group, an alkenyl group, an aromatic ring group, or a nitrogen atom-containing polar group as a substituent;
(ii) a monomer indicated by following formula (3):

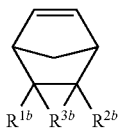

(3)

where
$R^{1b}$ and $R^{2b}$ each independently represent a hydrogen atom; a halogen atom; a hydrocarbon group having a carbon number of 1 to 20 and optionally having a substituent; or an organic group comprising a silicon atom or a nitrogen atom,
$R^{1b}$ and $R^{2b}$ are optionally bonded to each other to form a ring, and
$R^{3b}$ is a divalent hydrocarbon group having a carbon number of 1 to 20 and optionally having a substituent; or
(iii) a monomer indicated by following formula (4):

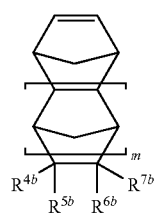

(4)

where
$R^{4b}$ to $R^{7b}$ each independently represent a hydrogen atom; a halogen atom; a hydrocarbon group having a carbon number of 1 to 20 and optionally having a substituent; or an organic group comprising a silicon atom or a nitrogen atom,
$R^{4b}$ and Rob are optionally bonded to each other to form a ring, and
m is 1 or 2,
wherein the proportion of the structural unit derived from said compound (A) among all structural units is not less than 20 mol % and not more than 100 mol %, and
wherein the cycloolefin polymer has a weight-average molecular weight of not less than 18,000 and not more than 100,000.

2. The cycloolefin polymer according to claim 1, wherein the proportion of the structural unit derived from the compound (A) among all structural units is not less than 20 mol % and not more than 90 mol %.

3. The cycloolefin polymer according to claim 1, wherein the remaining groups among $R_{2a}$ to $R_{5a}$, which are other than the naphthyl group, and $R_{1a}$ are each a hydrogen atom.

4. The cycloolefin polymer according to claim 1, having a weight-average molecular weight of not less than 20,000 and not more than 40,000.

5. The cycloolefin polymer according to claim 1, having a refractive index of not less than 1.545.

6. A method for producing a cycloolefin polymer, comprising performing a ring-opening polymerization of a naphthyl group-containing alicyclic compound (A) represented by following formula (1) or a ring-opened polymer comprising a structural unit derived from the compound (A):

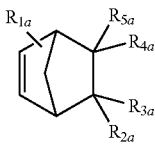

(1)

where one of $R_{2a}$ to $R_{5a}$ is a naphthyl group and remaining groups among $R_{2a}$ to $R_{5a}$ and $R_1$ are each independently:

(i) a hydrogen atom;

(ii) a halogen atom; or (iii) a substituted or unsubstituted hydrocarbon group having a carbon number of 1 to 30 and optionally having a linking group comprising an oxygen atom, a nitrogen atom, a sulfur atom or a silicon atom, except for the hydrocarbon group comprising an aromatic ring; and a structural unit derived from at least one norbornene-based monomer (B) different from the compound (A), wherein the norbornene-based monomer (B) comprises:

(i) a norbornene that is unsubstituted or has an alkyl group, an alkenyl group, an aromatic ring group, or a nitrogen atom-containing polar group as a substituent;

(ii) a monomer indicated by following formula (3):

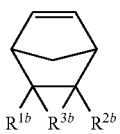

(3)

where $R^{1b}$ and $R^{2b}$ each independently represent a hydrogen atom; a halogen atom; a hydrocarbon group having a carbon number of 1 to 20 and optionally having a substituent; or an organic group comprising a silicon atom or a nitrogen atom, $R^{1b}$ and $R^{2b}$ are optionally bonded to each other to form a ring, and $R^{3b}$ is a divalent hydrocarbon group having a carbon number of 1 to 20 and optionally having a substituent; or (iii) a monomer indicated by following formula (4):

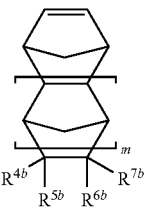

(4)

where $R^{4b}$ to $R^{7b}$ each independently represent a hydrogen atom; a halogen atom; a hydrocarbon group having a carbon number of 1 to 20 and optionally having a substituent; or an organic group comprising a silicon atom or a nitrogen atom, $R^{4b}$ and $R^{ob}$ are optionally bonded to each other to form a ring, and m is 1 or 2, wherein a proportion of a total number of moles of the compound (A) and the structural unit derived from the compound (A) relative to a total number of moles of all monomers and structural units in a feedstock for polymerization is not less than 20 mol % and not more than 100 mol %, and wherein the cycloolefin polymer has a weight-average molecular weight of not less than 18,000 and not more than 100,000.

7. The method according to claim 6, comprising performing a ring-opening polymerization of:

a feedstock for polymerization comprising:
the compound (A) or a ring-opened polymer comprising a structural unit derived from the compound (A); and
at least one norbornene-based monomer (B) different from the naphthyl group-containing alicyclic compound (A) or a ring-opened polymer comprising a structural unit derived from the norbornene-based monomer (B); or a feedstock for polymerization comprising a ring-opened polymer comprising a structural unit derived from the compound (A) and a structural unit derived from the norbornene-based monomer (B).

8. The method according to claim 6, wherein the ring-opening polymerization is performed in the presence of a metathesis polymerization catalyst, and the metathesis polymerization catalyst is a transition metal imide complex represented by formula (1):

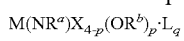

(1)

where

M is a metal atom selected from transition metal atoms of group 6 of the periodic table, $R^a$ is a phenyl group optionally having a substituent at at least one position of positions 3, 4 and 5 or a group represented by —CH$_2$R$^c$, where R$^c$ is a hydrogen atom, an alkyl group optionally having a substituent, or an aryl group optionally having a substituent, $R^b$ is an alkyl group optionally having a substituent or an aryl group optionally having a substituent, X is a halogen atom, an alkyl group, an aryl group, an aralkyl group or an alkylsilyl group, L is an electron donating neutral ligand, p is 0 or 1, q is an integer of 0 to 2, each X's may be the same or different if a plurality of X's are present, and each L's may be the same or different if a plurality of L's are present.

9. The method according to claim 6, further comprising hydrogenating a ring-opened polymer obtained by the ring-opening polymerization.

10. An optical element comprising the cycloolefin polymer according to claim 1.

* * * * *